United States Patent [19]

Lewis

[11] 4,432,677
[45] Feb. 21, 1984

[54] CUTTER FOR CYLINDRICAL LOCKS

[76] Inventor: Delmar D. Lewis, R.R. 2, Box 89, Letts, Iowa 52754

[21] Appl. No.: 330,619

[22] Filed: Dec. 14, 1981

[51] Int. Cl.³ .............................................. B23B 51/04
[52] U.S. Cl. .................................. 408/203.5; 408/82; 408/204
[58] Field of Search ..................... 408/203.5, 204, 205, 408/206, 207, 200, 201, 202, 225, 82, 224, 84; 407/11

[56] References Cited

U.S. PATENT DOCUMENTS

| 1,716,455 | 6/1929 | Miller | 408/200 |
|---|---|---|---|
| 1,892,863 | 1/1933 | Blanc | 407/11 |
| 1,941,551 | 1/1934 | Gjertsen | 408/84 X |
| 2,797,598 | 7/1957 | Labenz | 408/80 X |
| 3,130,763 | 4/1964 | Schlosser et al. | 408/205 |
| 3,244,035 | 4/1966 | Jehle et al. | 408/204 |
| 4,156,375 | 5/1979 | Crasnianski | 81/3 R |
| 4,167,363 | 9/1979 | Whitesel | 408/201 |
| 4,261,093 | 4/1981 | Steffen et al. | 408/204 X |

FOREIGN PATENT DOCUMENTS

| 591387 | 7/1925 | France | 408/204 |
|---|---|---|---|
| 2257381 | 8/1975 | France | 408/224 |

Primary Examiner—William R. Briggs
Assistant Examiner—Lawrence Meier
Attorney, Agent, or Firm—Henderson & Sturm

[57] ABSTRACT

A rotary tool, adapted to be chucked in a rotary power tool, is provided with cutting blades for cutting away the annulus that surrounds the core portion of a lock of the type referred to above. When the annulus is cut away, the tumbler mechanism is exposed axially outwardly so that the tumblers may be actuated by a depressor tool for opening the lock in the event the key has been lost. The cutter has an axial tubular front end portion that pilots on the lock core and fits the annular gap between the core and surrounding portion of the lock. The front end of the cutter has a stop portion projecting axially ahead of the front cutting edges to limit the depth of the cut and to prevent damage to the projecting ends of the tumbler pins.

1 Claim, 11 Drawing Figures

CUTTER FOR CYLINDRICAL LOCKS

BACKGROUND OF THE INVENTION

The cutter provided by the instant invention finds particular utility in the authorized opening of cylindrical locks of the horizontal-tumbler type in the event of loss of the key, for example. Such locks are used primarily in coin-operated machines because they provide substantially maximum security, being extremely difficult to pick, even by expert locksmiths. An especially well-known lock of this type is the "Ace", manufactured by the Chicago Lock Co. of Chicago, Ill. The keys for these locks bear the U.S. Pat. No. 1,984,202.

Basically, a lock of this type is cylindrical in construction and has an internal fixed part and a key-operated core or spindle that is angularly movable relative to the fixed part when the proper key actuates the tumbler mechanism to clear the tumblers from the radial interface between the fixed and movable parts. In a typical lock of this type there are seven sets of horizontal tumblers. Each is movable axially to clear the interface by means of a pin that is pushed by a projection of predetermined design on the front end of the tubular key. The pins are of different lengths, as are the key projections, the principle of operation being that the key will push all pins axially in their respective amounts until all tumblers just clear the interface, following which the key can turn the movable part relative to the fixed part and the lock will open.

The key-receiving core faces outwardly and is surrounded by an annular, fixed lock portion which prevents easy access to the tumblers except by the key or a rather complicated pick. There is an annular gap between the core and the annulus for receiving the tubular front end of the key, but this provides only limited working space for a locksmith using a pick.

According to the present invention, a rotary cutter is specially designed to pilot on the core in the annular gap just referred to. The cutter has circumferentially spaced cutting edges designed to cut away the annulus and thus to expose the tumbler pins. These pins may be easily removed, as by so-called needle-nose pliers, following which another special tool, in the form of a depressor, is used to move the tumblers axially to the rear in equal amounts so as to clear the interface, whereupon the depressor acts as a key in the sense that it can be used to turn the core or movable part of the lock. In a case where the lock has seven tumblers, the depressor has seven pins of a length equal to the axial thickness of the radial flange on the movable part into which the tumblers enter under spring loading as is typical of locks of this type. There is thus provided a quick, inexpensive and simple systen of opening locks of this type.

DESCRIPTION OF THE DRAWINGS

FIG. 1 is an enlarged, fragmentary longitudinal sectional view of a lock of the type referred to.

DETAILED DESCRIPTION OF A PREFERRED EMBODIMENT OF THE INVENTION

Figure 1:
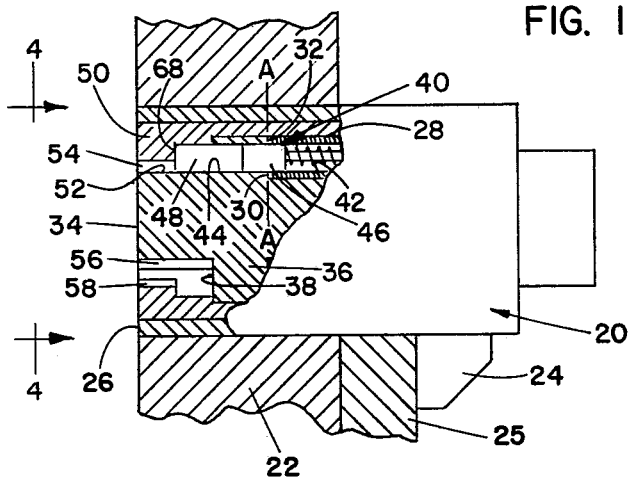
Figure 4:
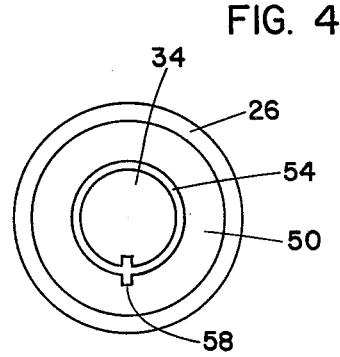
FIG. 4 is a front or face view of the lock as seen generally along the line 4—4 of FIG. 1.

Reference will be had first to FIG. 1 for purposes of general orientation. A lock 20 is shown as being appropriately mounted in a movable closure 22 (which may be of any type). The lock has a latch member 24 which normally engages behind a fixed part 25 of the cabinet or other structure of which the closure forms a part. Familiarity with locks of this type and the mountings thereof in cabinets and like structures will be assumed, and, therefore, description of details will be omitted.

The lock includes a cylindrical tubular casing 26 of steel or the like fixed into the closure. Fixedly carried coaxially within the casing is a fixed part or stator 28, which may be of brass, for example, and which has a front radial face 30 normal to the axis of the lock. This face lies in a plane A—A and axially abuts a complementary radial face 32 on a stator or core 34. This core is spindle-like at opposite end portions and is rotatable relative to the stator 28 when properly actuated. Intermediate its ends the core has an integral, radial circular flange 36, the rear face of which is the face 32 already described and the front face 38 of which is likewise radial and normal to the lock axis. As will be seen, the two radial faces 30 and 32 meet at the plane or interface A—A between the core and stator.

The core is normally locked to and unlocked from the stator by proper actuation of a plurality of sets (here seven) of tumbler mechanisms, generally designated at 40, appropriately received in a like plurality of bores 42 in the stator and 44 in the flange of the core 34. These bores are of course drilled on axes parallel to the lock axis. Each stator bore carries a spring loaded tumbler 46 and each core flange bore carries an axially movable pin or plunger 48. In the normal, locked condition of the lock, each tumbler projects across the interface A—A and into the core bore 44, limited only by means to be presently described.

Figure 2:
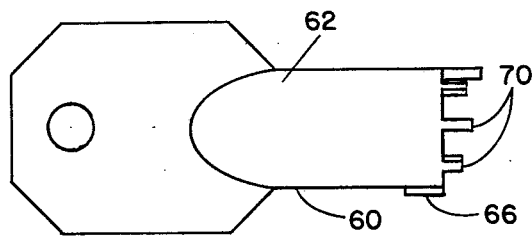
FIG. 2 is a side view of a key for the lock.
Figure 3:
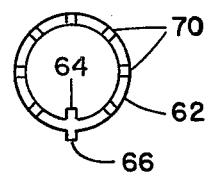
FIG. 3 is a front end view of the key.

The front part of the tubular lock casing has rigidly fixed therein an annulus or ring 50 of hardened steel or the like. This annulus has a central circular opening 52 which spacedly surrounds the front part of the core 34, leaving an annular gap or space 54. The core has a longitudinal keyway 56 which is normally alined radially with a shorter keyway 58 in the annulus. As seen in FIGS. 2 and 3, a key 60 has an axial tubular part 62 provided at its front part with internal and external lugs 64 and 66, respectively, which respectively fit the keyways 56 and 58. Internally, the annulus or ring 50 is of annularly shouldered design, having particularly a shoulder 68 which engages and limits outward movement of the tumbler pins 48. These pins are of different lengths and thus allow the tumblers to cross the interface A—A by different axial amounts. The front end of the key 60 has a plurality (here seven) of axially directed projections 70, each of different length. Thus a key matched to the lock will, when inserted, cooperate with the respective tumbler pins 48 to push them rearwardly the proper distances to enable the tumblers to clear the interface A—A, whereupon the key, by means of the internal lug 64 can turn the core and open the lock. The core may have any suitable means (not shown) cooperative with the latch 24 to withdraw the latch radially inwardly away from the stop 25. Also, when the key is inserted, the external lug 66 will clear the keyway 58 in the annulus so that the key may be turned.

Figure 5:
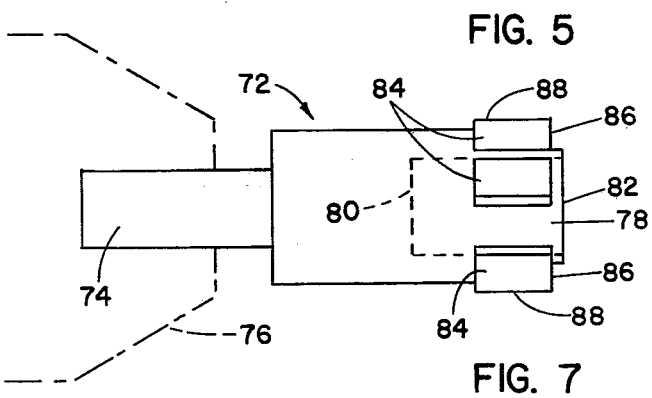
FIG. 5 is a side elevation of the cutting tool.
Figure 6:
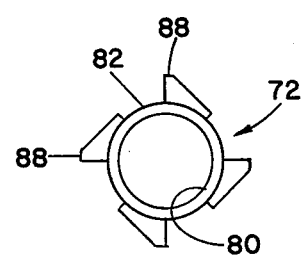
FIG. 6 is an end view of the same.
Figure 7:
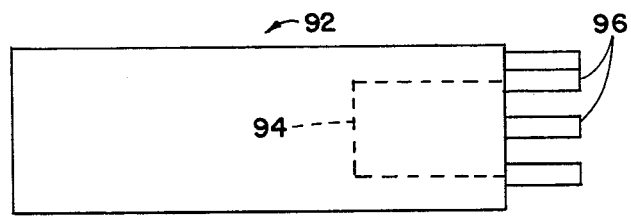
FIG. 7 is a side elevation of the depressor.
Figure 9:
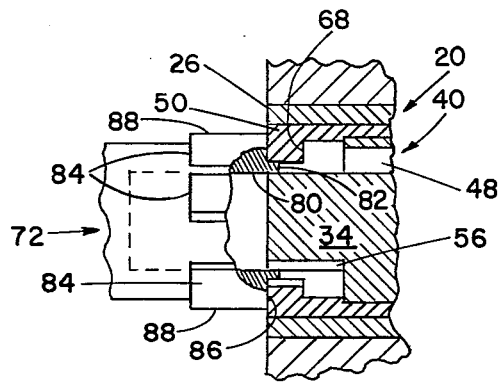
FIG. 9 illustrates the cutting tool in an initial position incident to cutting away the annulus of the lock.

FIGS. 5 and 7 show the cutting tool as comprising a somewhat axially elongated cylindrical body 72 having a rear end portion 74 adapted to be chucked (as suggested at 76) into any type of power tool, such as an electric or pneumatic drill (not shown). The body has an enlarged tubular front end portion 78, which may be formed as an axial counterbore 80 opening at its front at a smooth circular face 82 lying in a radial plane normal to the tool axis. The diameter of the counterbore is such that it will relatively closely fit the core 34 of the lock (see FIG. 9) and thus the tool will be piloted on the core as it rotates to cut away the annulus or ring 50 by a plurality of cutting blades 84 spaced angularly about the projecting uniformly radially outwardly from the tubular portion of the tool. Each blade has a front, radial cutting edge 86 and a longitudinal cutting edge 88 extending from its front edge in a rearward direction. The cutting edges are preferably parallel to the axis of the tool, and the front cutting edges are radial and lie in a common radial plane normal to the tool axis. This plane is offset axially rearwardly from the extreme from face 82 of the tool by an amount substantially equal to the amount by which the tumbler pins 48 project outwardly as limited by the shoulder 68 of the annulus 50, and thus the projecting end portion at 83 provides a stop, as will presently appear. The diameter across the cutting edges 88 is substantially equal to the O.D. of the annulus 50 and the axial length of these edges is slightly greater than the axial thickness of the annulus.

Figure 8:
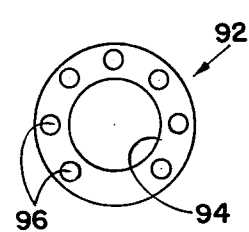
FIG. 8 is an end view of the same.
Figure 10:
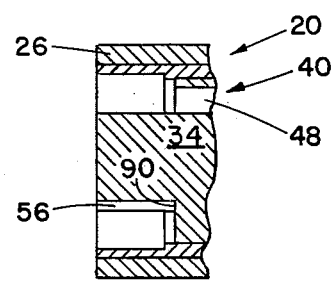
FIG. 10 illustrates the lock minus the annulus.
Figure 11:
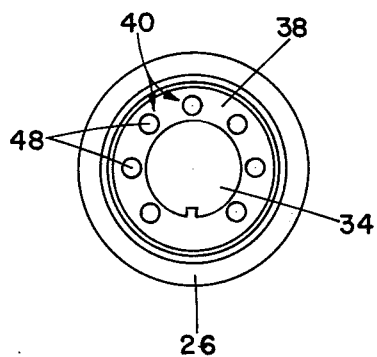
FIG. 11 is a face view of the structure shown in FIG. 10.

In use the chucked tool is piloted on the core 34 of the lock, the tubular portion, being interiorly smooth, easily riding the core and closely fitting the gap 54. As the tool rotates, its cutting edges cut the annulus 50 away from the core until the annulus is substantially completely removed (FIG. 10) to expose the tumbler pins 48. The proper depth of axial cut is determined by the amount of axial offset of the front cutting edges from the front 82 of the tool, the front end bottoming out against the interior portion of the core radial flange, as at 90 (FIG. 10) and thus do not cut the tumbler pins 48. When the tool is removed, the front ends of the tumbler pins are axially exposed (FIGS. 10, 11) and the pins may be easily withdrawn as by so-called needle-nose pliers or the like. This in turn leaves the tumbler pin bores 44 empty and available for use of a depressor 92 (FIGS. 7 and 8).

This tool is a cylindrical member of steel or the like and has a front end counterbore 94 adapted to fit the core 34. The front radial face of the depressor fixedly carries a plurality of depressor pins 96, here seven in number, spaced angularly apart to match the angular spacing of the tumbler pin bores. The pins are of a length equal to the axial thickness of the radial flange 36 of the core; or, stated otherwise, the length of the pins equals the depth of the tumbler pin bores. The depressor is inserted into the now open end of the lock, the pins 96 being respectively alined with the tumbler pin bores and pushed inwardly. This causes the tumblers to be pushed inwardly until their outer ends exactly clear the interface A—A. Since the depressor pins 96 cannot enter the tumbler bores 42 in the stator 28, the depressor now acts as a key by means of which the core can be turned to retract the latch 24 and the closure 22 can be opened and the lock removed and replaced, which is, of course, required, because removal of the annulus 50 substantially destroys the lock.

The cutting and depressor tools thus afford a simple, inexpensive and quick system for opening all locks of this type; i.e., different cutters and depressors are not required so long as all locks to be handled have the same dimensional characteristics. For different-sized locks, of course, similar but differently dimensioned tools will be required. These all have advantages over known picks, for example, as pointed out earlier herein. Features and advantages not specifically enumerated will occur to those versed in the art, as will many modifications and alterations in the tools described, all of which may be achieved without departure from the spirit and scope of the invention.

I claim:

1. A rotary cutting tool for gaining access to the horizontal tumbler mechanism of a cylindrical lock having a central core surrounded by a ring provided with an annular interior surface of greater diameter than the exterior annular surface of the core so as to provide an annular gap receivable of a tubular key, said cutter comprising a one-piece cylindrical body having a rear end adapted to be chucked in a power tool and a coaxial tubular front end portion terminating in a smooth annular face radial to the axis of the body, said front end portion having an annular wall of such radial thickness as to fit into the gap of the lock and said annular wall having a continuous, smooth, interior annular surface for piloting of the tool on the lock core, said tubular portion having rigid with and exteriorly thereof a plurality of like cutter blades equi-angularly spaced apart and terminating in a radial plane offset axially rearwardly from the annular front face, each blade having a radial front cutting edge and an outer cutting edge extending rearwardly and lengthwise of the body for cutting out an annular portion of the lock ring to expose the tumbler mechanism.

* * * * *